March 8, 1966  W. H. BINYON  3,238,671
GROWER'S CROSSBAR AND CONTAINER ASSEMBLAGE
Filed March 9, 1964
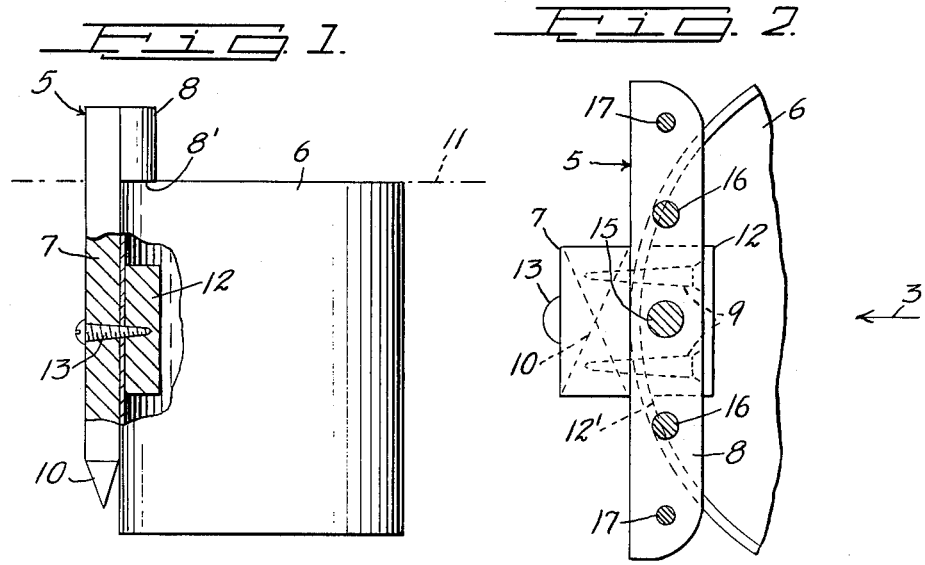
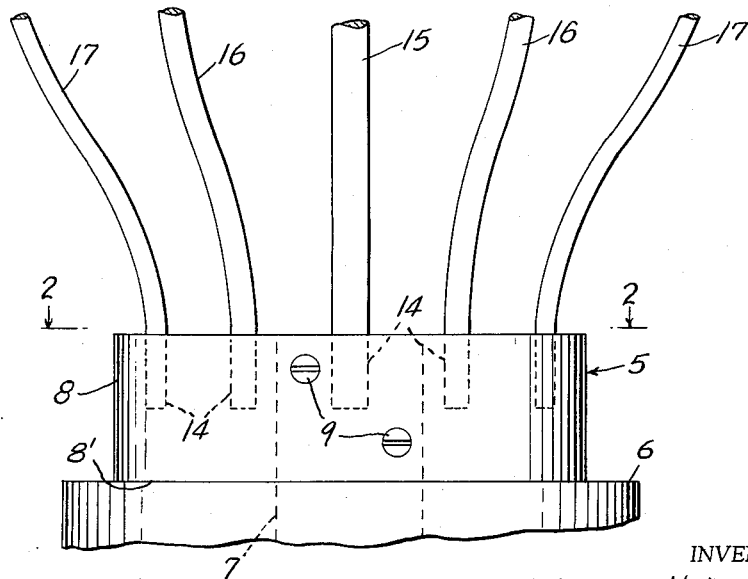
INVENTOR.
WALTER H. BINYON
BY
Howard E. Thompson
ATTORNEY

United States Patent Office 3,238,671
Patented Mar. 8, 1966

3,238,671
GROWER'S CROSSBAR AND CONTAINER
ASSEMBLAGE
Walter H. Binyon, 32 Franklin St., Cedar Grove, N.J.
Filed Mar. 9, 1964, Ser. No. 350,359
2 Claims. (Cl. 47—37)

This invention relates to an assemblage adapted for use by professional growers, nurserymen and the home gardner in support as well as arrangement of plant life growth of any type or kind to facilitate care during the growing period, as well as to simplify transportation and re-planting without appreciably disturbing the growth and, at the same time, maintaining the support and/or arrangement during transportation, re-planting and continued growth after transplanting. More particularly, the invention deals with an assemblage comprising a crossbar mounted in connection with a container, preferably having disintegrating properties.

Still more particularly, the invention deals in an assemblage, wherein the crossbar of the assemblage includes means supporting a plurality of support and arrangement rods projecting above the assemblage and, wherein, at least part of such rods are capable of flexure or bending in providing the desired support and/or arrangement of the growth.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side view of an assemblage made according to my invention, with parts of the construction broken away and in section, indicating in dot-dash lines the approximate ground level in use of the assemblage and omitting rods shown in FIG. 2.

FIG. 2 is an enlarged plan view of the structure as seen in FIG. 1, omitting part of the container; and FIG. 3 is a view looking in the direction of the arrow 3 of FIG. 2 showing only the upper portion of the container and illustrating the lower portion of the support and arrangement rods of the assemblage.

In illustrating one adaptation and use of my invention, I have shown in the accompanying drawing at 5 a crossbar or T of the assemblage and at 6 the container. In the construction shown and to illustrate one simple economical adaptation of my invention, the crossbar 5 is formed of two parts, namely a post part 7 and a crosshead part 8 arranged upon one and secured to one surface of the part 7 at the upper end thereof, as by screws 9, shown in FIGS. 2 and 3 of the drawing.

The lower end of the post part 7 is pointed, as seen at 10 FIG. 1, to facilitate driving into the ground in certain uses of the assemblage.

The container 6 is preferably formed from any material which, in a period of time, will disintegrate when submerged in the ground, the ground level in use of the device being diagrammatically illustrated by the dot-dash line 11 in FIG. 1. A tin can may be used for this purpose or any special composition-type of can or container can be used and such types and kinds of containers are well-known in the art.

In attachment of the crossbar or T5 to the container 6, the lower surface 8' of the crosshead part 8 is seated upon the upper edge of the container 6, with the surface of the post part 7 arranged upon the periphery of the container 6. A block 12 of suitable material is arranged upon the inner surface of the container and a suitable fastening device, such as a screw 13, note FIG. 1, is passed through the post 7, the container 6 and into the block 12. The block 12 preferably has a rounded surface 12', as indicated in dotted lines in FIG. 2, to seat snugly upon and at least generally conform to the contour of the wall of the container, particularly when this container is round, as shown.

The upper surface of the crosshead 8 has a plurality of apertures 14 which, in the construction shown, are of different diameters for the support of rods of diameters to fit snugly in said apertures. In the construction shown, five rods are employed by way of illustration, namely a central main support rod 15 of large diameter, two supplemental support rods 16 of smaller diameter than 15 and beyond 16 are two other still smaller diameter supplemental rods 17. The lower portions of the rods only are shown in FIG. 3, it being understood that these rods extend above the crosshead 8 an appreciable distance and in any desired spread for support of any growth extending from the container 6 to maintain such growth either in a supported state, or in a predetermined display arrangement, depending entirely upon the nature of the plant, flower, tree or the like which may be in the process of growing and, particularly, where it is desirable to not only support the growth as it proceeds to rise upwardly, but also to control arrangement or positioning of the growth.

With assemblages of the type and kind under consideration, the prime mover or, in other words, the original grower, will plant seed, seedlings or the like which, in some instances, would be cuttings, in the container filled with prepared soil and the container, thus prepared, is planted in the ground as, for example, in the ground level indicated at 11 in FIG. 1 of the drawing. As this plant life grows, the growth is supported on the rods 15–17, inclusive, and these rods are bent or flexed to arrange or support this growth in any desired manner. In connection with attachment of the growth to the rods, known means of support or tying can be employed. On the other hand, such means as the fasteners and the devices disclosed in companion applications filed by me of equal date herewith can be used for attachment of the growth to the rods, as well as the support thereof.

At the time that the grower, nurseryman or the like wishes to sell a predetermined growth, the entire assemblage and whatever remains of the container at that time are removed from the ground and transported with reasonable protection to at least the container or root portion of the growth so that, when this grown assemblage reaches its destination for transplanting, all that the operator has to do is to dig a hole for reception of the container or the root growth around the container and the adjacent soil, burying the same to the desired level. This entire operation can be performed without disturbing in any appreciable way the support of the growth attached to the rods and, further, the arrangement thereof controlled by positioning of the rods during transportation.

In many instances, the extent of growth at the time of transplanting may not necessarily be of a height to extend to end limits of the rods employed, thus these rod ends can be further utilized for continued support and/or arrangement of the growth to suit the fancy of the individual. In connection with the continued growth, it will be understood that, even though the container may ultimately disintegrate, the post 7 of the crossbar can be utilized for firm support of the growth, even to the degree that this post can be tamped into the ground and the soil compactly packed therearound. From this latter standpoint, the post 7, or the complete crossbar, can be made of a material serving long life. As a matter of fact, after the plant growth in question has reached its size as to not require the support of the assemblage, the entire assemblage can be removed and re-used in conjunction with another container to again perform its initial function and operation.

At this time, it should further be pointed out that, insofar as a grower or nurseryman is concerned, the crossbar comprising the post and the crosshead and, possibly, even the block 12 can be removed from a fully developed growth and its container without disturbing the container, keeping in mind that it has doubtlessly distintegrated and the crossbar can be re-used in the manner above stated.

Having fully described my invention, what I claim as new and desired to secure by Letters Patent is:

1. An assemblage of the character defined comprising a crossbar, the crossbar comprising a post with a crosshead at its upper end, a container, means for attaching the container to the crossbar with the lower end of the crosshead seating upon the upper edge of the container, said means comprising a block on the inner surface of the container and a fastener mounted in the post and container and engaging said block, and said crosshead having means supporting a plurality of support and arrangement rods projecting above said crosshead.

2. An assemblage as defined in claim 1, wherein said rods are formed of bendable material, and said container is formed of a disintegrating material.

References Cited by the Examiner
UNITED STATES PATENTS

| | | | |
|---|---|---|---|
| 221,620 | 12/1879 | Sikes | 47—47 |
| 548,508 | 10/1895 | Bjelland | 47—47 |
| 890,948 | 6/1908 | Waite | 47—47 |
| 1,586,676 | 6/1926 | Heath | 47—37 |
| 2,725,676 | 12/1955 | Pucci | 47—47 |
| 2,817,190 | 12/1957 | Matson | 47—47 |
| 2,917,868 | 12/1959 | Presnick | 47—47 |
| 3,076,289 | 2/1963 | Gallo | 47—47 X |

ABRAHAM G. STONE, *Primary Examiner.*

J. R. OAKS, *Assistant Examiner.*